Nov. 30, 1954 G. C. SZIKLAI 2,695,926

VIDEO ABSORPTION MODULATION OF TELEVISION CARRIER FOR RETRANSMISSION

Filed Nov. 30, 1944

INVENTOR.
GEORGE C. SZIKLAI
BY H. S. Grover,
ATTORNEY 2,695,926

VIDEO ABSORPTION MODULATION OF TELEVISION CARRIER FOR RETRANSMISSION

George C. Sziklai, Princeton, N. J., assignor to Radio Corporation of America, a corporation of Delaware Application November 30, 1944, Serial No. 565,872

The terminal fifteen years of the term of the patent to be granted has been disclaimed 7 Claims. (Cl. 178—7.2)

Figures 1, 2:
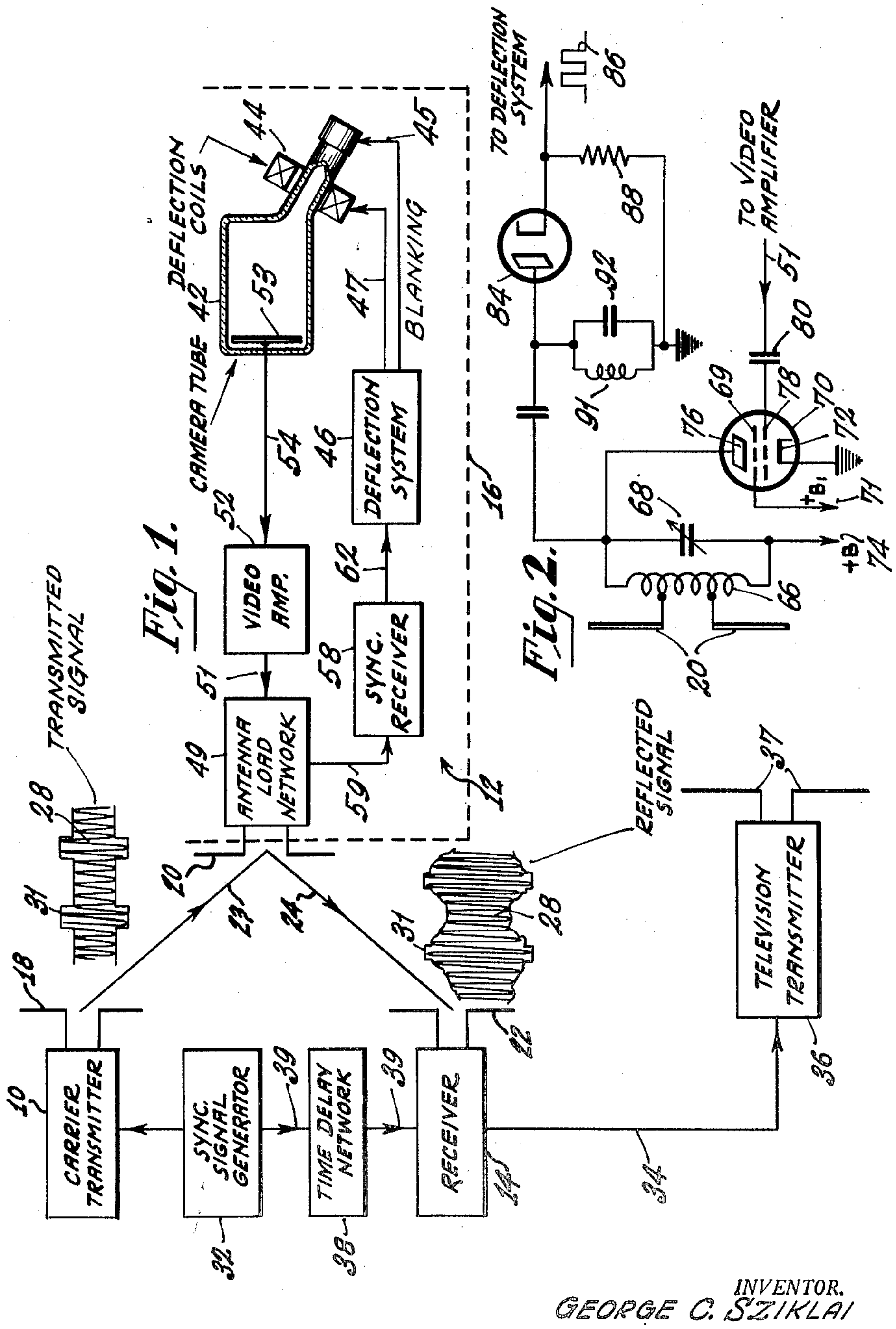

The present invention relates to television systems and apparatus, and more particularly to a novel television system embodying a novel pickup or camera device which is readily portable and does not require a physical connection with the remaining equipment.

The system of the present invention includes a carrier signal radiator, a signal absorbing means, such as a reflector, which may be loaded in accordance with intelligence signals, and a receiver for the carrier. Equipment constructed in accordance with this invention and having generally the parts named is especially suitable for transmission of intelligence representing an image of a view or object which is more or less remotely situated with respect to the carrier radiator and receiver. When the invention is employed for the purpose of obtaining a television signal, novel methods to be disclosed herein are preferably used for the purpose of obtaining synchronism in the camera unit which generates the initial image signals and also in the receiver for the reflected signals. Also, if desired, these novel methods may be employed to synchronize other receivers to which the image signals are ultimately directed. Accordingly, the principal object of the invention is to provide a novel communication system in which a carrier signal is modulated with intelligence signals at a given point in its radiation path.

Another object is to provide a novel communication system in which a reflected carrier signal is modulated with intelligence signals at the point of reflection.

A further object of the invention is to provide a novel means for synchronizing the deflection circuits of a television camera and/or a television receiver.

A still further object of the present invention is to provide a conveniently portable source of intelligence signals, and more especially intelligence signals representing the scanning of a view, object, or other subject matter.

A still further object of the invention is to provide a novel means for loading a reflector for radiating signals.

A still further object of the present invention is to provide a television camera which is synchronized over a carrier path from a more or less remote point.

Other objects and advantages of the invention will, of course, become apparent and immediately suggest themselves to those skilled in the art to which the invention is directed from a reading of the following specification in connection with the accompanying drawings in which:

Fig. 1 is a diagrammatic showing of a television relay system embodying the invention; and Fig. 2 shows, illustratively, a means in accordance with the invention for loading a reflector of radiant energy.

Referring for the present to Fig. 1 of the drawings, there is shown, by way of example, a complete system embodying the invention comprising a carrier transmitter 10, a camera unit indicated in its entirety by reference character 12, and a receiver 14. The camera unit 12 is shown as being at least partially enclosed within a dotted rectangle 16. This dotted rectangle may be regarded as a casing or housing so that the camera unit 12 will be readily portable as a unitary device. The component parts of the camera unit 12 will be later described, but for purposes of illustration, it may be pointed out that the camera tube itself is preferably of the so-called storage type, such as that known in the art as the "Iconoscope" or the "Orthicon," although non-storage types such as the so-called "dissector tube" may also be used. The operation of all of the tubes is too well known to require further explanation herein.

The carrier transmitter 10 may be of any suitable type or kind generating a high frequency carrier which can be radiated from a directive antenna 18. The camera unit 12 is provided with a wave absorber and/or reflector 20. The receiver 14 is provided with an antenna 22 which is preferably of the type providing directive reception. The path of the waves from the carrier transmitter antenna 18 to the receiver antenna 22 is symbolically indicated by lines 23 and 24. While a path has been indicated which includes a reflective element 20, it will be understood that the element 20 may have an absorbing function only and that the paths 23 and 24 may be substantially in alignment. From the foregoing very general description, it will be seen that the camera unit 12 does not of itself operate as a transmitter in the usual sense, inasmuch as it does not include a generator of a wave which is to be radiated.

The carrier transmitter 10 may be of any usual type which is suitable for generating a carrier frequency to be radiated by the antenna 18. If the invention is to be applied to a television use in accordance with the illustrative showing of the drawings, the transmitter 10 will include a source of very high frequency oscillations together with the necessary equipment, including amplifiers if desirable or necessary, for coupling the oscillator to the antenna 18. There are several ultra high frequency power generators which are not readily modulated. Examples of these are the magnetron and the Barkhausen oscillator. These devices, however, are capable of generating fairly high powers with good efficiency and can be pulsed to add the pulses 31, described hereinafter, and therefore, they are especially suitable for use in the transmitter 10. The general nature of the carrier signal radiated by the antenna 18 is indicated at 28, and the envelope (shown by a solid line) preferably includes sync pulses 31 of the kind usually employed for synchronizing television equipment and in some cases for blanking purposes. The curves of Fig. 1 which illustrate the carrier 28, and the pulses 31 are not drawn to scale and do not necessarily show wave forms obtained in practice. A convenient means for obtaining pulse modulation of the carrier 28 is indicated at 32 and may comprise the usual sync signal generator employed in television apparatus. An example of a system for generating television synchronizing signals is shown in the patent to Bedford, No. 2,192,121, granted February 27, 1940. Smith patents, No. 2,132,654 and No. 2,132,655, both granted October 11, 1938, show impulse generators for scanning control and sync pulses. These patents have been cited merely by way of example, and it will be understood that any desired kind or type of equipment may be employed for originating, modulating or pulsing, and radiating the carrier 28 if equipment resembling that of the above-mentioned Bedford patent is employed. It will be understood that the camera tube and its function will be omitted at the transmitter 10. Provision for this omission is set forth above as one of the objects of this invention.

The receiver 14 may be of any desired kind or type and may, if desired, include an image producing means, such as an image producing tube (not shown). If the image producing tube is present, visual representation of the intelligence signals generated by the camera unit 12 will be obtained. However, a suggested use for the invention is the retransmission of signals originated by the camera unit 12 along with the usual sync signals and, therefore, the receiver 14 may be provided with output means associated with a connection 34 to feed a television transmitter 36. This transmitter 36 may be of the usual television broadcast type which broadcasts a complete television signal from the transmitting antenna 37. It is, of course, within the scope of the invention to employ a highly directional antenna or antenna array in place of the broadcast antenna 37.

The receiver 14 may be synchronized in any suitable manner, such as by a separate sync signal generator operating in step with the signal generator 32, or it may be controlled from the sync signal generator over a radio transmission link. The drawings illustrate the preferred arrangement, in which a time delay network 38 is employed in a physical connection 39 between the generator 32 and the receiver 14. The time delay network provides a time delay corresponding to the time delay of the transmission and reflection paths 23 and 24, respectively. With changes in position of the antenna 20 relative to the radiator 18 and the receiver 22, or the shift of the receiver 14 relative to either or both 18 and 20, it may frequently be necessary to adjust the time delay provided by the delay network 38. To this end the time delay network 38 may include well known forms of delay circuits comprising series inductance and shunt capacity, for example, with the number of sections being variable to provide the required delay.

The camera unit 12, which, as stated above, may be enclosed in the housing 16 so that it will be readily portable, includes a camera tube 42 of any desired kind, such as a storage type of tube of the form above mentioned or an image dissector. Examples of suitable storage type tubes are shown by U. S. patents granted to Iams, Rose, and others in low-velocity scanning beam tubes which include 2,213,173; 2,213,174; 2,213,175; 2,213,176; 2,213,177; 2,213,178; 2,213,179; 2,213,547; 2,213,548; 2,288,402 and others and also described in the article entitled "The Orthicon, a Television Pick-up Tube" by Rose and Iams in "RCA Review," vol. IV, No. 2, October 1939, and in another article by the same authors entitled "Television Pick-up Tubes Using Low Velocity Electron Beam Scanning" from "Proceedings of the I. R. E.," vol. 27, No. 9, September 1939. Various patents have issued to disclose various features of the high velocity scanning beam tubes, known as the "Iconoscope" and include, among others, 2,099,980; 2,156,391; 2,201,215; and 2,258,728. Many published articles also describe this tube and its operation.

Deflection coils 44, operated from a deflection system 46 over a connection 47, serve to deflect the beam provided by the electron gun in the camera tube for scanning. While deflecting coils have been shown for convenience, it will be understood that electrostatic deflecting plates or other suitable beam deflecting means may be employed. Blanking may be provided as indicated by the connection 45. The above-mentioned Bedford patent is illustrative of a camera tube, together with a deflection system. The deflection system may operate to provide interlaced scanning, a method of operation which is set forth in a patent to Ballard, No. 2,152,234, granted March 28, 1939.

Transmitting tubes, sync signal generators, and other equipment normally associated with a camera tube in the usual television transmitter, are omitted from the camera unit 12 and, therefore, the power consumption is reduced considerably and the unit is more compact and economical. Inasmuch as the power requirements are quite low, readily portable means may be employed as a power source.

The signal reflector 20 is connected to a load network 49, which has means for selectively absorbing energy from the carrier 28. When the energy absorption is maximum, the receiver 14 will receive a minimum signal and vice versa. This absorption means provides, in a novel manner, for furnishing intelligence to the receiver point 14 from the camera unit 12. This intelligence may, in accordance with the showing of the drawing, represent the scanning of an image. However, it is within the scope of the invention to control the absorption means by any source of intelligence signals, for example, by telegraph or telephone message signals. Also, the pulses 31, which are indicated as being a modulation product of the carrier 28, may take any other desired form, such as intelligence signals, to be interpreted at the location of the load network 49. With the arrangement selected for illustration, the antenna load network 49 is controlled over a connection 51 by a video amplifier 52 which amplifies video signals fed from the mosaic and signal plate 53 of the camera tube 42 over a connection 54.

The load network 49 is preferably of such a character that some of the energy in the carrier 28, including the pulse signal 31, may be detected to provide sync signals for the camera tube deflection system 46. The means for doing this is indicated diagrammatically in Fig. 1 by a sync receiver 58 associated with the load network over a connection 59. The output of the sync receiver 58 is furnished to the deflection system 46 over a connection 62.

A suitable load network and sync receiver is shown more in detail in Fig. 2 of the drawings, in which the same reference characters will be used for corresponding parts in Fig. 1. The reflector 20 is connected to tapped points on an inductance 66. This inductance is tuned by a condenser 68. The impedance of the circuit represented by the inductance and capacity combination 66 and 68 is connected in parallel for high frequencies with the space discharge path of a vacuum tube 70 shown as a tetrode having a screen grid 69 connected to a suitable source of positive bias 71. The cathode 72 is grounded, as shown, and the source of positive potential 74 for the anode 76 is also, as is the general practice, grounded at a more or less negative point so that, as stated, the resistance and capacity combination is in series with the space discharge path of the tube.

The signal grid 78 of the tube 70 is connected, by way of a coupling condenser 80, to any source of intelligence signals. In the system selected for illustration, this signal source is the video amplifier 52 and the connection in Fig. 2 to the control grid is, therefore, also labeled 51.

As the control voltage applied to the signal grid 78 fluctuates, the total impedance of the series path will change resulting in a change of the degree of absorption of the signal arriving over the radiation path 23. When the signal voltage at the grid 78 becomes more positive, the entire impedance of the series absorbing path will be decreased, and if the impedance of the antenna is larger than that of free space, which is usually taken as 376.6 ohms, the absorption will be increased and, as a result, the amount of signal available at the antenna 22 will be decreased. This has the effect of modulating the reflected carrier 28 in accordance with intelligence signals applied to the grid 78 of the tube 70. The load modulation may be considered as analogous to a transmission line. The analogy resides in the apparent fact that when the antenna and its associated circuit have the same impedance as free space, the transmission path will be properly terminated and the intersected power will be absorbed, while, if the apparent impedance of the antenna is different (if it is lowered or increased above this value) the power is reflected.

The carrier voltage across the inductance 66 will change with the level of the applied carrier 28, this voltage being a maximum upon occurrence of the peak value of the pulse 31. The pulse 31, therefore, may be detected in a diode detector 84 connected, as shown, so that the detected pulses 86 are applied in a positive direction to the deflection system 46, the latter being of the usual television receiver type including a blocking oscillator which is to be tripped by the pulses 86. The level of the pulses may be set in any suitable manner and clipping or other means may be employed to insure effective tripping of the blocking oscillator. The D. C. load circuit of the diode 84 includes a load resistor 88 and a high impedance circuit comprising an inductance 91 and a condenser 92.

Variation of absorption of the carrier 28 may also be accomplished by changing the tuning of the antenna 20 and its associated circuit. This may be readily done, for example, by a reactance tube which is well known in the art. Patent No. 2,140,339, granted to C. Travis, December 13, 1938, and Patent No. 2,121,103, granted to S. W. Seeley, June 21, 1938, are examples of circuits in which a tube controls the tuning of a circuit. When the reflecting antenna 20 is tuned to the transmitted signal, it will absorb the maximum energy thereof. On the other hand, when it is detuned, it will reflect most of the radiated and intersected power.

In operation of the arrangement just described, the camera unit 12 may be employed as a "spot" pick-up device, for example, on a playing field to follow the more interesting portions of the game which is being televised. As an example of another field of use, the camera unit 12 could be used for military purposes and be carried by an operator or by a remotely controlled vehicle or craft (neither shown). The synchronization of the entire system, comprising the carrier transmitter 10, the camera tube 42 and the receiver 14 may operate as described under control of the single sync generator 32. The control function of the sync signal generator 32 may, if desired, be extended to the television transmitter 36 in the event that the video signals from the camera tube 42 are to be relayed to a more or less distant point.

While the power of the carrier transmitter 10 must be of a high enough level to provide a suitable signal over the direct and reflected paths, nevertheless, the cost of such a transmitter is considerably lower than the cost of a large number of low power transmitters which are replaced by the camera unit 12 of this invention.

Suitable means are provided for maintaining the reflector 20 in such position and direction with respect to the radiator 18 and the receiving antenna 22 that absorption and/or reflection will occur in a manner to be effective to convey intelligence to the receiver 14 at all times. The specific nature of the means employed, other than simple manually operated directional antenna turning and orienting means, is beyond the scope of the present invention.

When facsimile communication is desired by the novel communication system disclosed herein, the pulses 31 may be more widely spaced in point of time to serve as facsimile phasing signals. It is, of course, within the scope of the present invention to substitute a facsimile scanner of any kind known to the art for the camera tube scanner 42 shown by way of example.

Various modifications of the invention shown and described herein by way of example are possible without departing from the spirit and scope of the invention described herein, and it is desired that any and all such modifications be considered within the purview of the present invention as defined by the hereinafter appended claims.

Having now described the invention, what is claimed and desired to be secured by Letters Patent is the following:

1. In a communication system, a carrier signal generator, a sync signal generator, modulating means in said carrier signal generator controlled by said sync signal generator, means to radiate said carrier signal, a receiver having means to receive said radiated carrier signal, means for generating an image signal, means associated with said image signal generating means having synchronizing means controlled by said carrier when modulated with sync signals, means interposed in the radiation path of said carrier signal to effect selective absorption thereof in accordance with said video signal whereby a video signal modulated carrier is provided for said receiver.

2. A television signalling system comprising a signalling unit having means for reflecting high frequency radiant energy signals received from a first remote point and re-directing them toward a second remote point, a load network coupled to said means, means for scanning a subject to develop image signals representative thereof, means operating under control of the developed image signal for causing a varying degree of absorption of the carrier signal received prior to its re-direction, and means located at said second remote point to re-radiate the re-directed signal as modified by the image signal controlled absorption.

3. A television signal originating unit comprising a reflective antenna for reflecting high frequency radiant energy signals, a load network coupled to said antenna, a television camera tube, means for controlling said camera tube to produce a scanning operation, means for providing said controlling means with a synchronizing signal received by said antenna, and means for causing a varying degree of absorption of a carrier signal received by said antenna, said last named means operating under control of said camera tube.

4. A television camera unit for originating a television image signal at a point more or less remote from a television receiver and also from a source of carrier signal to be modulated by said image signal comprising a television camera tube, a deflection system for said television camera tube operative to cause said tube to scan a view or object, an antenna, a variable impedance device connected to said antenna, means connected to said antenna by way of said variable impedance device for causing operation of said deflection system under control of signals incident on said antenna, and means for connecting said camera tube to said variable impedance device so that the image signal output of said camera tube is operative to vary the impedance of said antenna whereby the reflective properties of said antenna are altered in accordance with a characteristic of the image signal generated by said camera tube.

5. A unitary portable image signal originating camera unit comprising in a self-contained manner a camera tube, a deflection system control for said camera tube, a sync receiver and an antenna load network, a reflective antenna coupled to said antenna load network, said sync receiver being coupled on its input side to said antenna load network and on its output side to said deflection system control, and means including an amplifier for supplying the output of said camera tube to said antenna load network.

6. A signalling system comprising means to develop electrical energy representative of intelligence to be communicated, means associated with the first named means to absorb signal modulated carrier frequency energy directed between origin and destination points, means responsive to the modulated carrier frequency energy to control the operation of said first named means, and means to vary the carrier absorption in proportion to the intelligence signals developed.

7. In a communication system, a carrier signal generator, means to modulate the generated carrier signal with a control signal, means to radiate said signal modulated carrier, a receiver having means to receive said radiated carrier signal, means interposed in the radiation path of said carrier signal to effect selective absorption thereof whereby a signal of varying strength is provided for said receiver, and means operating under control of said modulated carrier for controlling said selective absorption effecting means.

References Cited in the file of this patent

UNITED STATES PATENTS

| Number | Name | Date |
|---|---|---|
| 1,559,992 | Schaffer | Nov. 3, 1925 |
| 2,047,930 | Linder | July 14, 1936 |
| 2,073,643 | Linsell | Mar. 16, 1937 |
| 2,101,440 | Linsell | Dec. 7, 1937 |
| 2,193,102 | Koch | Mar. 12, 1940 |
| 2,293,148 | Kell | Aug. 18, 1942 |